United States Patent [19]
Mukawa

[11] Patent Number: 6,137,602
[45] Date of Patent: Oct. 24, 2000

[54] OPTICAL SYSTEM FOR OBSERVATION OF VIRTUAL IMAGE

[75] Inventor: Hiroshi Mukawa, Kanagawa, Japan

[73] Assignee: Sony Corporation, Tokyo, Japan

[21] Appl. No.: 09/312,278

[22] Filed: May 14, 1999

[30] Foreign Application Priority Data

May 18, 1998 [JP] Japan .................................. 10-135770

[51] Int. Cl.[7] .................................................. G03H 1/00
[52] U.S. Cl. .............................. 359/14; 359/13; 359/631; 345/8
[58] Field of Search ................................ 359/13, 14, 19, 359/20, 631; 345/7, 8, 9

[56] References Cited

U.S. PATENT DOCUMENTS

| | | | |
|---|---|---|---|
| 3,633,988 | 1/1972 | Farrar | 359/13 |
| 5,305,124 | 4/1994 | Chern et al. | 359/13 |
| 5,712,649 | 1/1998 | Tosaki | 359/13 |

OTHER PUBLICATIONS

Magarinos et al., "Holographic Mirrors", Optical Engineering, vol. 24, No. 5, pp. 769–780, Sep. 1985.

*Primary Examiner*—Darren E. Schuberg
*Attorney, Agent, or Firm*—Frommer Lawrence & Haug, LLP.; William S. Frommer; Gordon Kessler

[57] ABSTRACT

In an optical system used for observing a virtual image, in which a Lippman volumetric hologram is used as a reflection type holographic optical element, the generation of aberration needs to be minimized to enable an optimum virtual image to be viewed. To this end, at least one optical element and the Lippman volumetric hologram 10 are provided for cooperating to form a virtual image of the display image on an image display device 6. The Lippman volumetric hologram 10 is contoured so that its curvature is in the same direction as the curvature of interference fringes operating for generating a refractive power in this Lippman volumetric hologram 10.

10 Claims, 13 Drawing Sheets

OPTICAL SYSTEM FOR OBSERVATION OF VIRTUAL IMAGE

BACKGROUND OF THE INVENTION

1. Field of the Invention

This invention relates to an optical system used in observing a virtual image of an image displayed on an image display device.

2. Description of the Related Art

There has so far been proposed an optical system used in observing a virtual image of an image displayed on an image display device, such as an LCD (liquid crystal display). As an optical element capable of constructing this optical system to a small size, there has been proposed a Lippman volumetric hologram.

That is, if a light beam radiated from an image display apparatus is reflected by the Lippman volumetric hologram and the reflected light is observed, the Lippman volumetric hologram operates as a reflection type holographic optical element having a reflective power, such as a hologram lens, so that a viewer is able to observe a virtual image of a displayed image by the image displaying apparatus.

Meanwhile, in an optical system for observing a virtual image, in which the Lippman volumetric hologram is used as a reflection type holographic optical element as described above, there is raised a problem in connection with the aberration produced in the Lippman volumetric hologram. This amount of the aberration depends on the shape of the hologram, that is on the shape of a hologram substrate.

If the hologram is planar, as conventionally, there are occasions wherein the aberration generated on passage of the light beam through the holographic optical element is increased to render it impossible to realize sufficient performance as the optical system. The generation of the aberration becomes particularly outstanding when the F-number of the hologram lens is small.

SUMMARY OF THE INVENTION

It is therefore an object of the present invention to provide an optical system used for observing a virtual image in which, with the use of the Lippman volumetric hologram as a reflection type holographic optical element, generation of the aberration can be suppressed sufficiently to enable an optimum virtual image to be observed.

In one aspect, the present invention provides an optical system used for observing a virtual image including an image display device, and at least one optical element and a Lippman volumetric hologram cooperating with each other to form a virtual image of a display image of said image display device. The Lippman volumetric hologram is contoured so as to have a curvature of the same direction as a curvature of interference fringes operating for generating a refractive power in the Lippman volumetric hologram.

In another aspect, the present invention provides an optical system used for observing a virtual image including an image display device and a Lippman volumetric hologram for forming a virtual image of a display image of the image display device. The Lippman volumetric hologram is contoured so as to have a curvature of the same direction as a curvature of interference fringes operating for generating a refractive power in the Lippman volumetric hologram.

In this optical system used for observing a virtual image, the Lippman volumetric hologram is contoured to have a curvature only in one direction. Alternatively, the Lippman volumetric hologram may be contoured so that its curvature direction will be coincident with the direction of eccentricity of the optical system, or the radius of curvature of the Lippman volumetric hologram is set to 10 mm or more to enable an optimum virtual image to be formed. A light beam splitting element may be provided between the image display device and the Lippman volumetric hologram.

In the optical system used for observing a virtual image, the Lippman volumetric hologram is used like a hologram lens in the optical system. The amount of aberration generated in the holographic optical element can be reduced by having the Lippman volumetric hologram contoured so as to have the curvature of the same direction as the curvature of interference fringes produced in the holographic medium. This is particularly the case with a so-called light lens with a small F-number. If the Lippman volumetric hologram formed of e.g., a film-shaped photopolymer, has a meniscus shape, having a curvature only in one direction, it cam be attached more easily. Also, if this Lippman volumetric hologram is arranged so that its direction of the unidirectional curvature is coincident with the direction of eccentricity of the optical system, the aberration due to the eccentricity can be reduced efficiently.

Thus, with the present invention, there is provided an optical system used for observing a virtual image employing a Lippman volumetric hologram as the reflection type holographic optical element, in which the amount of aberration is sufficiently suppressed to enable an optimum virtual image to be viewed.

DESCRIPTION OF THE PREFERRED EMBODIMENTS

Referring to the drawings, preferred embodiments of the present invention will be explained in detail.

Figure 1:
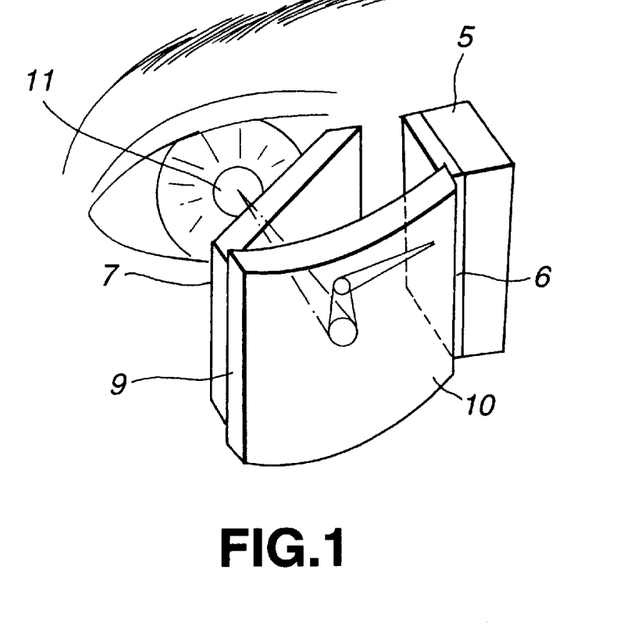
FIG. 1 is a perspective view showing the structure of a first embodiment of the optical system used for observing a virtual image according to a first embodiment of the present invention.

An optical system used for observing a virtual image according to the present invention is constructed of a non-co-axial type employing a Lippman volumetric hologram 10, which is a reflection type diffraction optical element, as a reflection optical element, as shown in FIG. 1.

In this optical system used for observing a virtual image, video signals 1 are inputted to an LCD driver (liquid crystal display driving circuit) 2. From the LCD driver 2, an LED (light emitting diode) lighting current 3 and a driving signal 4 for driving an LCD (liquid crystal display) 6, which serves as an image display device, are outputted and entered to a backlight 5 and to an LCD 6.

The backlight 5 includes an LED array 5a made up of 8 so-called chip-size LEDs, arranged in two horizontal rows and four vertical columns, each having a center light-emitting wavelength of 525 nm, as a light source. On the side of the LCD 6 of the LED array 5a is arranged a diffusion plate 5b for uniforming the luminance of the illuminated light from the LED array 5a and for controlling the diffusion angle. The diffusion angle from the LED array 5a is set to approximately 10° in terms of a half-value angle.

As the LCD (liquid crystal display) 6, as the image display device, a transmission type liquid crystal display of e.g., 0.55 inch may be used. In this LCD 6, image signals as electrical signals are converted into an image and the light radiated by the backlight 5 so as to be transmitted through this LCD 6 is modulated in accordance with the image. The light beam transmitted through the LCD 6 is incident on a wedge-shaped polarizing type beam splitter 7 operating as a light beam splitting device. The angle of incidence from the LCD 6 to the wedge-shaped polarizing type beam splitter 7 is set to approximately 40°.

Figure 2:
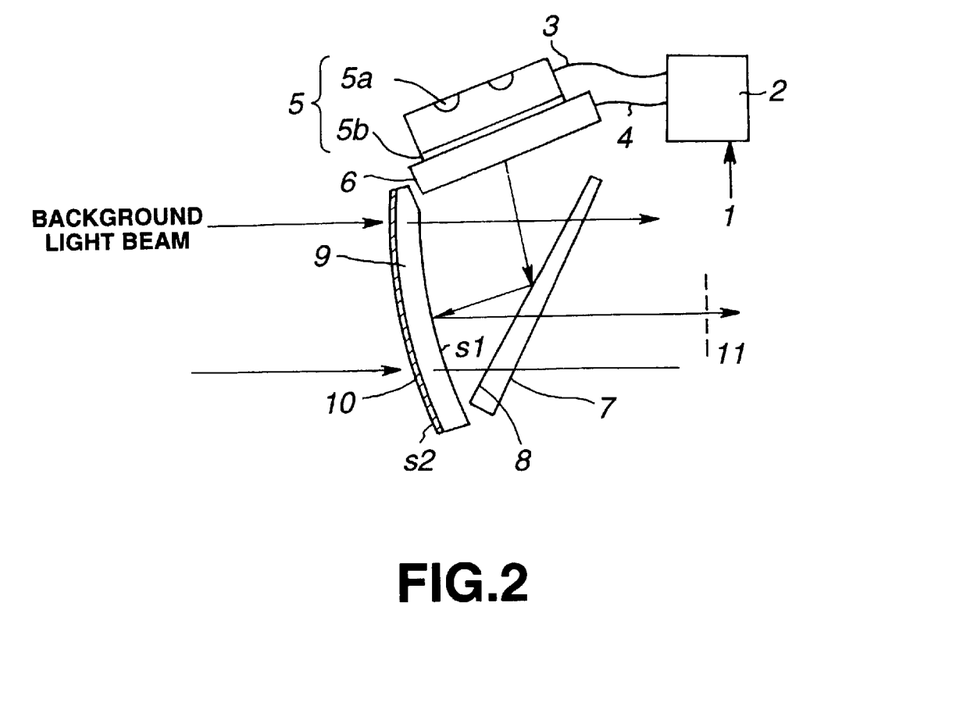
FIG. 2 is a plan view showing the structure of the optical system used for observing a virtual image shown in FIG. 1.

In this wedge-shaped polarizing type beam splitter 7, a portion of the total incident light volume is transmitted through this wedge-shaped polarizing type beam splitter 7, with the remaining portion being reflected by a polarizing type light beam splitting film 8 formed on the wedge-shaped polarizing type beam splitter 7 so as to fall on a HOE (holographic optical element) substrate 9. The wedge opening angle of the wedge-shaped polarizing type beam splitter 7 is 1° to 5°, while that of an optical system shown in FIG. 2 is 3°. Referring to FIG. 1, the HOE substrate 9 is formed as a concave cylindrical surface with respect to the incident light from the wedge-shaped polarizing type beam splitter 7. In the light beam which has passed through this HOE substrate 9, only light rays of a specified wavelength range is selectively reflected by the Lippman volumetric hologram 10 provided on the reverse surface of the HOE substrate 9. Here, only the light rays in a wavelength range of the order of 10 nm in terms of the total width of a half value, centered about 525 nm as the wavelength of the light source, are reflected.

The light rays, reflected by the Lippman volumetric hologram 10, are again transmitted through the HOE substrate 9 to fall on the wedge-shaped polarizing type beam splitter 7, with a portion of the incident light being transmitted through the wedge-shaped polarizing type beam splitter 7 to fall on a pupil 11 of a viewer. On the other hand, the light beam of the background, proceeding from the reverse side of the HOE substrate 9, is transmitted through the Lippman volumetric hologram 10, HOE substrate 9 and the wedge-shaped polarizing type beam splitter 7 to fall on the pupil.

In a spectrum of light rays reaching the pupil 11 from the background, the light rays with the wavelength in the vicinity of 525 nm are reflected by the Lippman volumetric hologram 10, so that the light intensity of the wavelength range is lowered substantially in inverse proportion to the diffraction efficiency.

In this optical system used for observing a virtual image, the HOE substrate 9 is designed as a substantially cylindrical surface of a meniscus shape having only a unidirectional curvature along the same direction as the curvature of the interference fringes in the hologram, as shown in FIGS. 1 and 2. A reason of setting the HOE substrate 9 so as to have this cylindrical shape is that the amount of aberration produced in the Lippman volumetric hologram 10 needs to be suppressed while another reason is that, since the Lippman volumetric hologram 10 is formed of a film-shaped photopolymer, approximately 70 $\mu$m in thickness constituted by a holographic photosensitive layer approximately 20 $\mu$m in thickness and a polyester cover film approximately 50 $\mu$m in thickness, it is difficult to mount on a plane having a two-dimensional curvature.

Also, in this optical system used for observing a virtual image, the direction of curvature of the Lippman volumetric hologram 10 is set so as to coincide with the direction of eccentricity of the optical system, for the purpose of reducing the aberration generated due to eccentricity. Meanwhile, the shape of the Lippman volumetric hologram 10 is determined by the shape of the hologram annexing surface of the HOE substrate 9 holding this Lippman volumetric hologram 10.

If the HOE substrate 9 has a refractive power, a background image, seen through the HOE substrate 9, may be enlarged or contracted, moved in its position, or the aberration may be introduced, thus occasionally deteriorating the viewability significantly to render it impossible to view the background spontaneously. It is therefore critical for the HOE substrate 9 in this optical system used for observing a virtual image not to have a refractive power. Thus, in this optical system used for observing a virtual image, in which limitations are imposed on the surface shape of the surface s2 of the HOE substrate 9 carrying the Lippman volumetric hologram 10 for the purpose of reducing the amount of the aberration as described above, the shape of the remaining surface s1 of the HOE substrate 9 is selected to give the refractive power of the HOE substrate 9 equal to zero.

Also, in this optical system used for observing a virtual image, since the HOE substrate 9 is designed as a concave surface or a non-spherical concave surface, without being planar, stray light produced by surface reflection by the HOE substrate 9 is prevented from falling on the pupil 11. Moreover, the radius of curvature of the HOE substrate 9 is set so as to be sufficiently different from a value twice the distance between the HOE substrate 9 and the pupil 11. This is relevant to the focal length of the concave mirror being equal to one-half the radius of curvature and is aimed at preventing the light beam from the periphery of the pupil 11 from becoming collimated by surface reflection of the HOE substrate 9 to fall on the pupil 11 to form an image on the retinal tissue to produce a ghost image.

In the above-described embodiment, only the green color light is displayed. However, full-color display is also possible if the Lippman volumetric hologram 10 is prepared by multi-exposure with laser light beams of three prime colors of red (R), green (G) and blue (B), and a backlight light source containing the spectrum of R, G and B is used as a backlight light source. Also, if the Lippman volumetric hologram 10 is colored, there is produced a merit that the spectral components for R, G and B are evenly dropped when the background light is transmitted through the Lippman volumetric hologram 10, with the result that the background color can be perceived as being more spontaneous colors.

Figure 3:
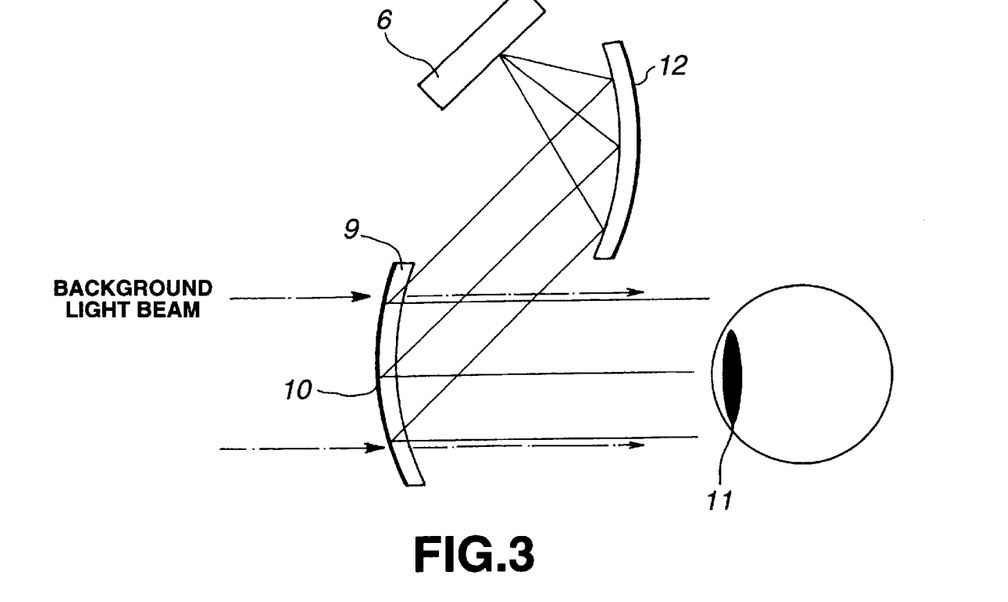
FIG. 3 is a plan view showing the structure of a second embodiment of the optical system used for observing a virtual image according to a second embodiment of the present invention.
Figure 4:
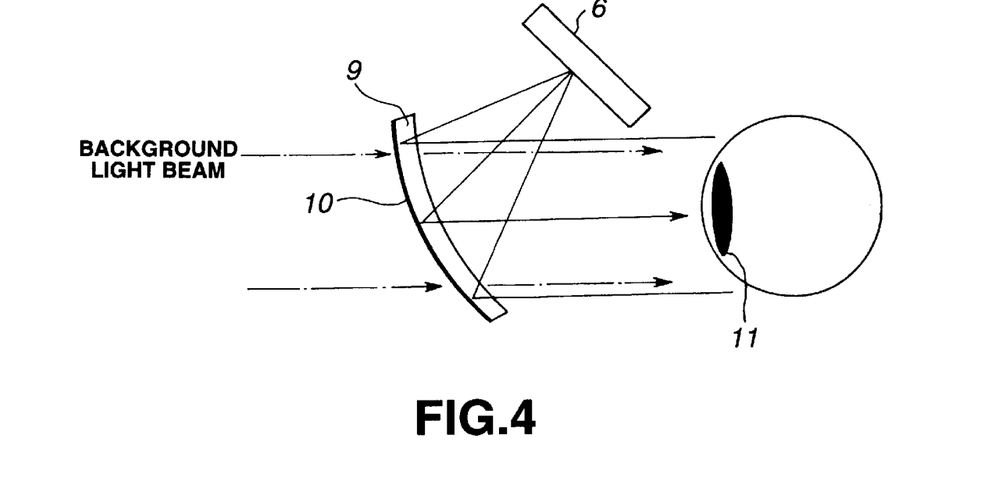
FIG. 4 is a plan view showing the structure of a second embodiment of the optical system used for observing a virtual image according to a third embodiment of the present invention.

The optical system used for observing a virtual image according to the present invention includes an image display device 6, a reflection mirror of a free curved surface 12, and a Lippman volumetric hologram 10, as shown in FIG. 3. That is, the light radiated from the image display device 6, such as a LCD, is reflected by the reflection mirror of a free curved surface 12 and by the Lippman volumetric hologram 10, in this order, prior to reaching the pupil 11. Alternatively, the optical system used for observing a virtual image according to the present invention can be constructed by the image display device 6 and the Lippman volumetric hologram 10, as shown in FIG. 4. In this case, the light radiated from the image display device 6, such as LCD, is reflected by the Lippman volumetric hologram 10 to reach the pupil 11. In these embodiments, shown in FIGS. 3 and 4, the HOE substrate 9, carrying the Lippman volumetric hologram 10, is designed to have a curvature in the same direction as the curvature of the interference fringes generated in the hologram, instead of being planar. The result is that optimum aberration characteristics can be realized, while stray light due to surface reflection by the HOE substrate 9 is prevented from falling on the pupil 11.

In the above-described embodiments, a transmission type LCD (liquid crystal display) is used as an image display device. However, the image display device may also be a variety of image display devices, other than the transmission type LCD, such as a reflection type LCD, an electroluminescence image display device, as a spontaneous light emitting element, or a field emission display.

If the Lippman volumetric hologram 10 is used in an optical system as a holographic optical element, such as a hologram lens, as described above, it is possible to reduce the amount of the aberration generated by this holographic optical element by constituting the Lippman volumetric hologram 10 so as to have the curvature of the same direction as that of the interference fringes generated in the holographic medium and by manufacturing the Lippman volumetric hologram 10 by heat treatment following light exposure. This is particularly the case with a so-called light lens with a small F-number. If the Lippman volumetric hologram 10, formed of e.g., a film-shaped photopolymer, has a meniscus shape, having a curvature only in one direction, it cam be attached in position more easily. Also, if this Lippman volumetric hologram 10 is arranged so that its direction of the unidirectional curvature is coincident with the direction of eccentricity of the optical system, the aberration due to the eccentricity can be reduced efficiently.

The method for construction and the function of the Lippman volumetric hologram 10 is hereinafter explained. The Lippman volumetric hologram 10 is formed of a holographic material, such as photopolymer or a dichromate gelatine and, if viewed in the cross-sectional view of FIG. 5, includes plural interference fringes, at which the refractive index is modulated.

In the case of a typical photopolymer, the center refractive index n and the degree of modulation of the refractive index $\Delta n$ are 1.52 and 0.06, respectively. As may be seen from FIG. 5, the interference fringes in the Lippman volumetric hologram 10 are introduced substantially along the direction of thickness of the material. These interference fringes can be realized by causing two light beams to fall on the front and back sides of the hologram at the time of the hologram printing.

Figure 5:
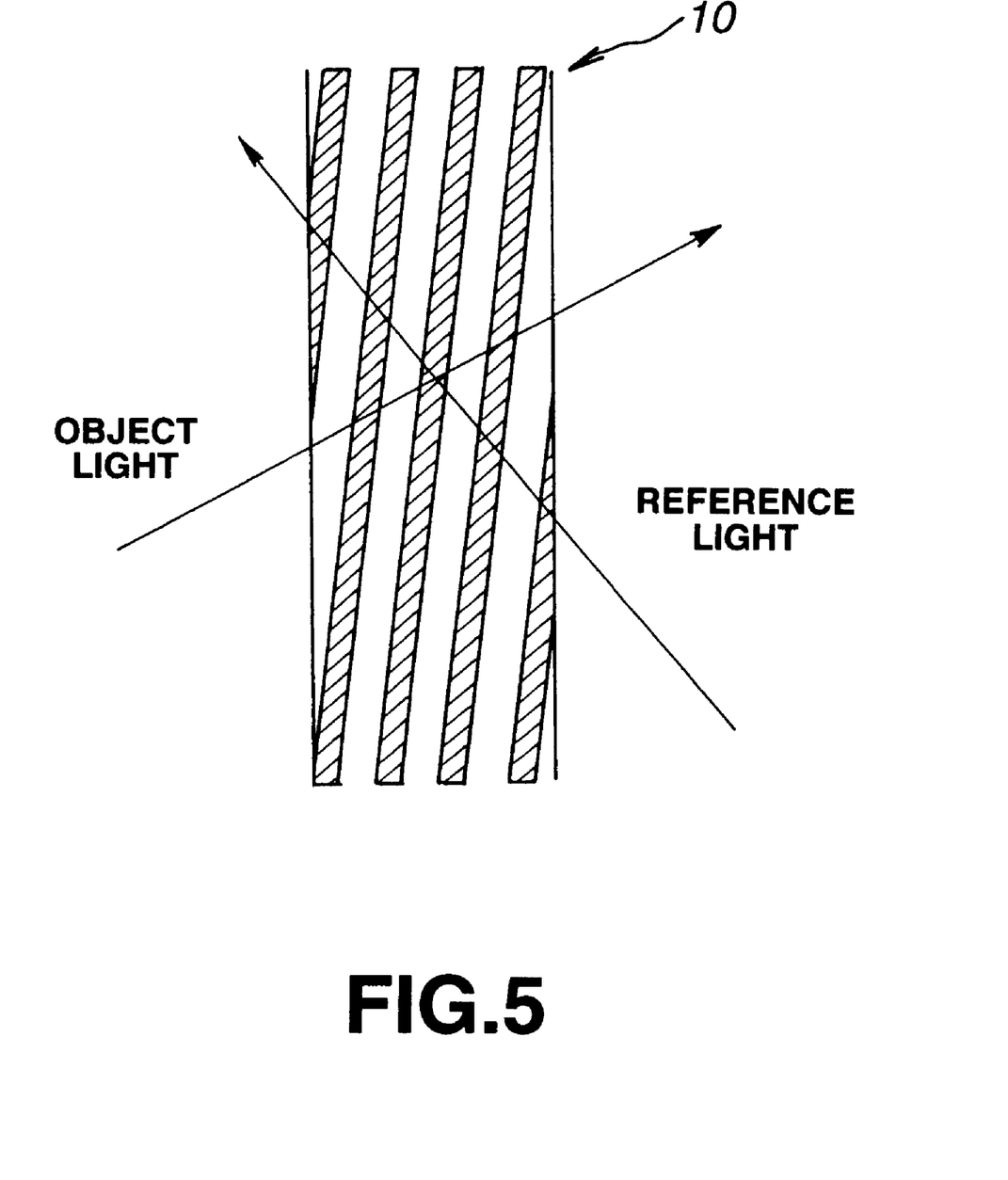
FIG. 5 is an enlarged cross-sectional view showing the structure of a Lippman volumetric hologram constituting the optical system used for observing a virtual image.
Figure 6:
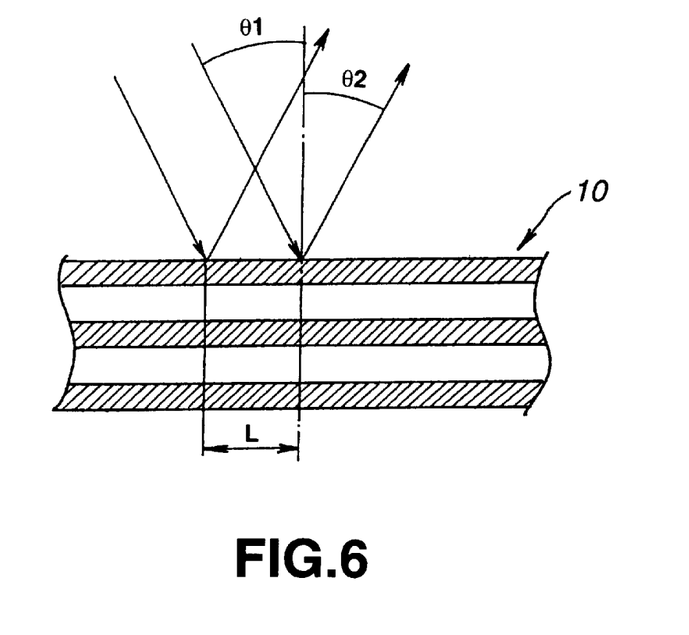
FIG. 6 is a cross-sectional view for explanation of a phenomenon in the Lippman volumetric hologram shown in FIG. 5 (surface reflection).
Figure 7:
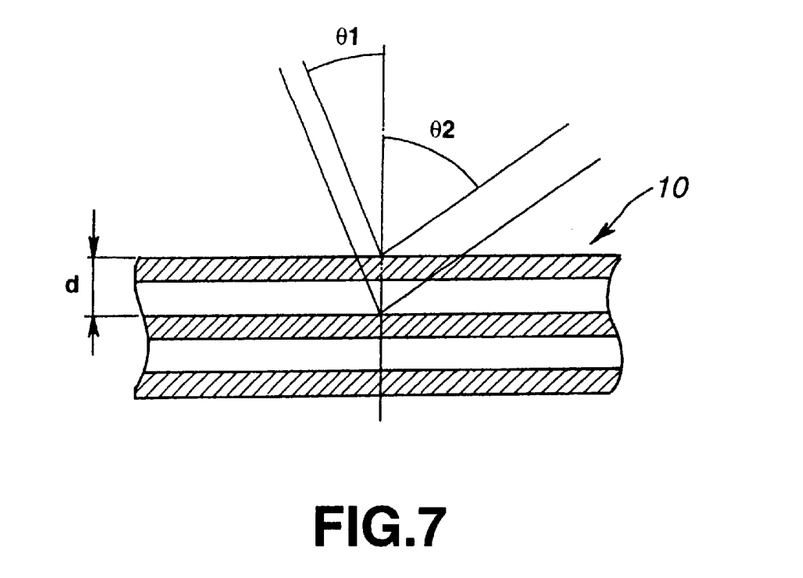
FIG. 7 is a cross-sectional view for explanation of another phenomenon in the Lippman volumetric hologram shown in FIG. 5 (reflection other than surface reflection).

The principle of reproducing this hologram is now explained. For analyzing the behavior of the diffracted light, it is sufficient to scrutinize at which reflection angle $\theta_2$ the diffused light rays from the respective layers of the interference fringes strengthen each other.

This is achieved under the following two conditions. The first condition is that diffused components at two different points on a certain layer strengthen each other. This condition is met if the relation:

$$L \sin \theta - L \sin \theta_2 = m\lambda$$

where L is the distance between the two points, is met. In order for this relation to hold for an arbitrary value of L, it suffices if the above equation is an identity for L, that is if $$\theta_1 = \theta_2 \tag{1}$$

Next, in order for diffused components of two different layers to strengthen each other, the following equation (2):

$$d \cos \theta_1 + d \cos \theta_2 = m\lambda \tag{2}$$

where d is the distance between the two lines, needs to be met. From the equations (1) and (2), 2d cos $\theta_1$=m$\lambda$ (Bragg's diffraction condition).

For m=1 (first order), 2d cos $\theta_1$ $\lambda$.

That is, the Bragg's diffraction may be said to be a mirror-surface reflection having wavelength selectivity or angle selectivity. By recording suitable interference fringes on a hologram, the light rays of a certain wavelength $\lambda$, incident on the hologram, may be deflected in an optional direction for reflection. Thus, the hologram can be used as a reflective mirror having the lens function.

Figure 8:
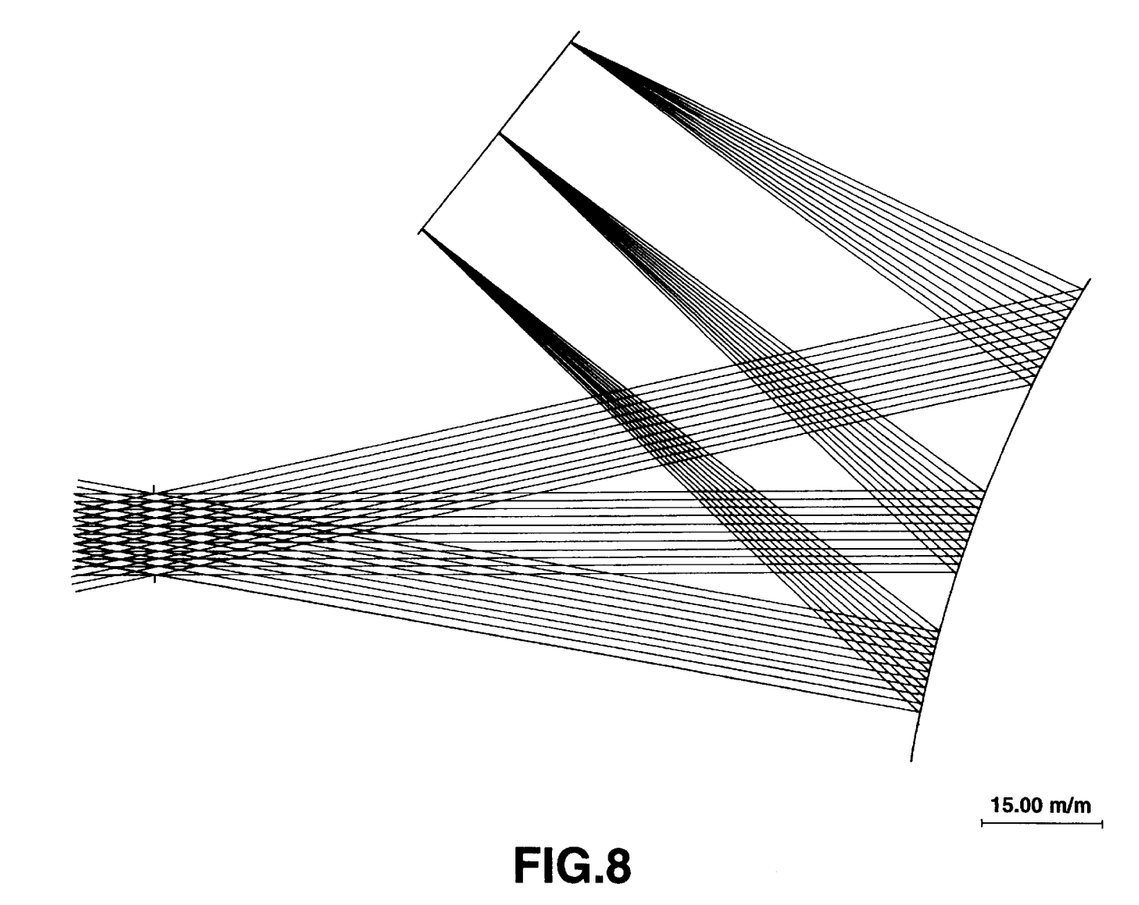
FIG. 8 is a light ray tracing diagram showing the paths of the light beam when the Lippman volumetric hologram is formed to have a convex surface.
Figure 9:
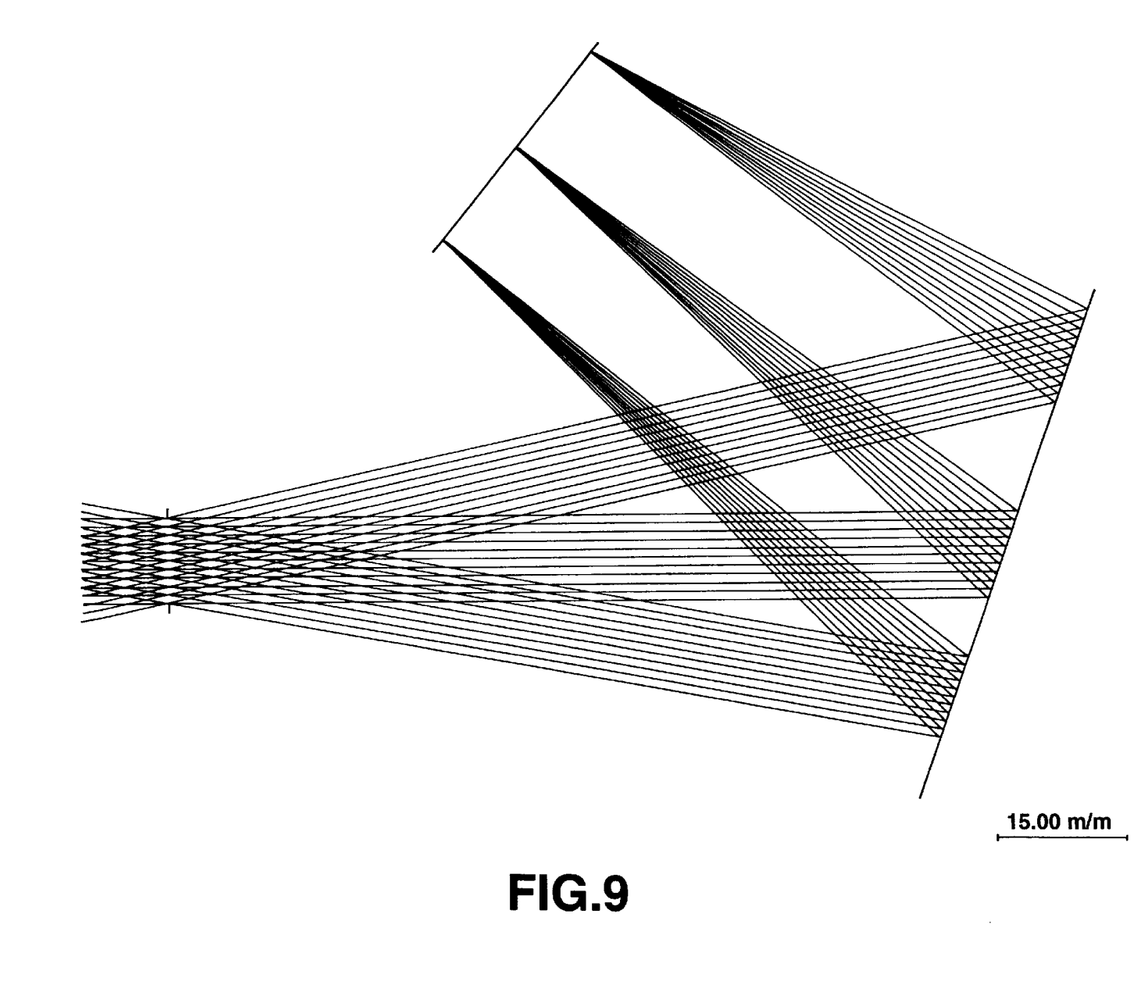
FIG. 9 is a light ray tracing diagram showing the paths of the light beam when the Lippman volumetric hologram is formed to have a planar surface.
Figure 10:
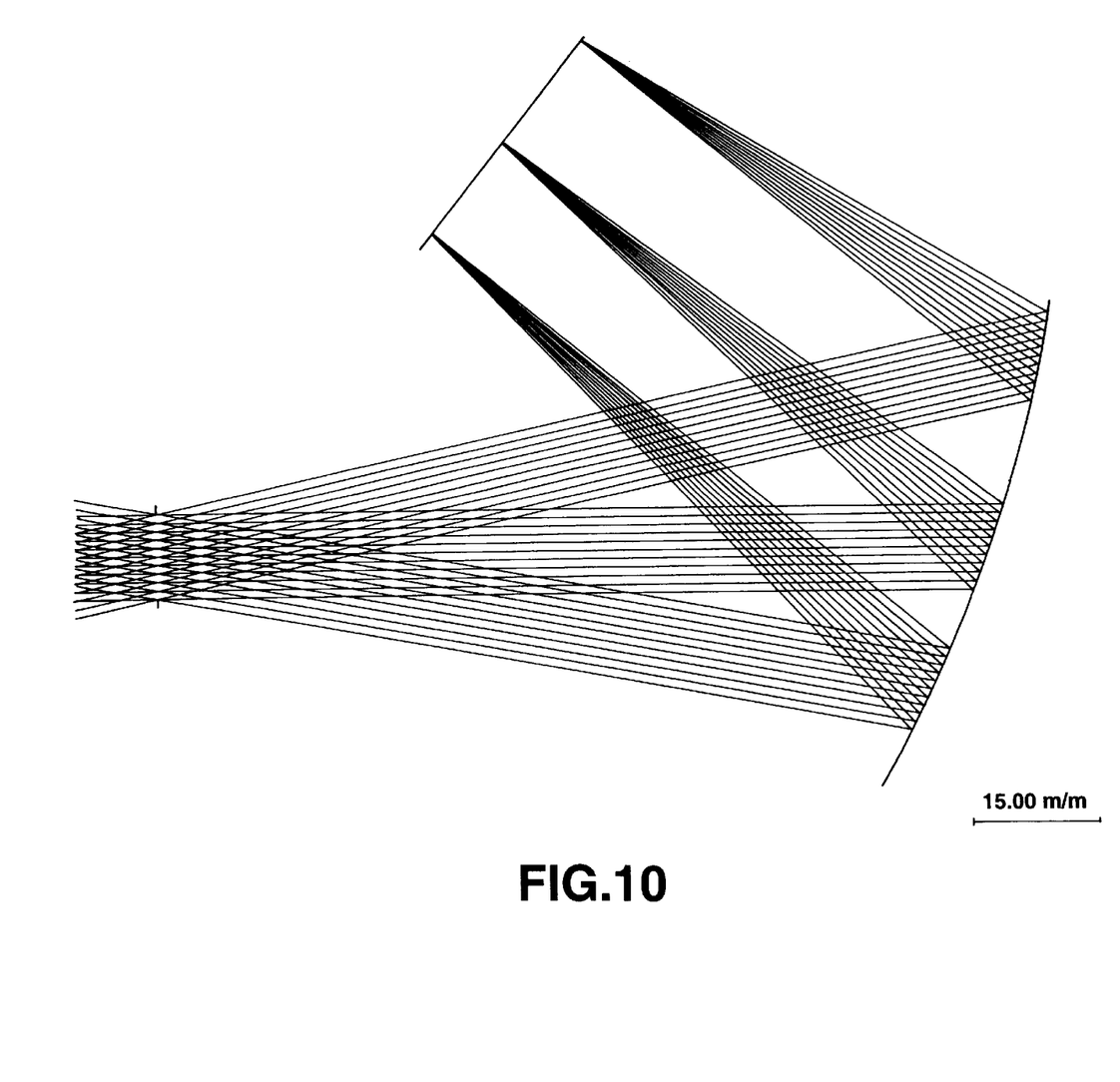
FIG. 10 is a light ray tracing diagram showing the paths of the light beam when the Lippman volumetric hologram is formed to have a concave surface.
Figure 11:
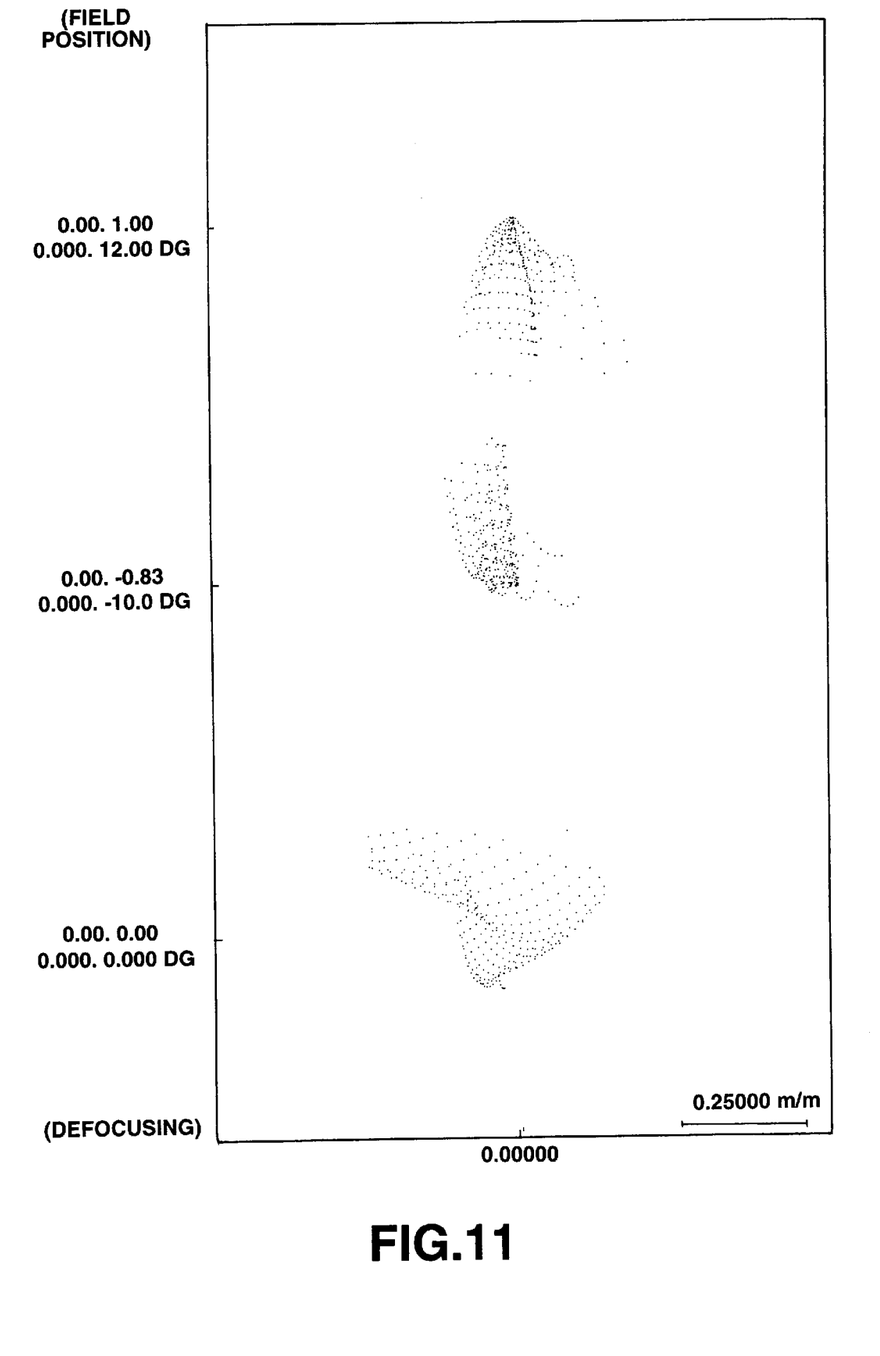
FIG. 11 is a spot diagram when the Lippman volumetric hologram is formed to have a convex surface.
Figure 12:
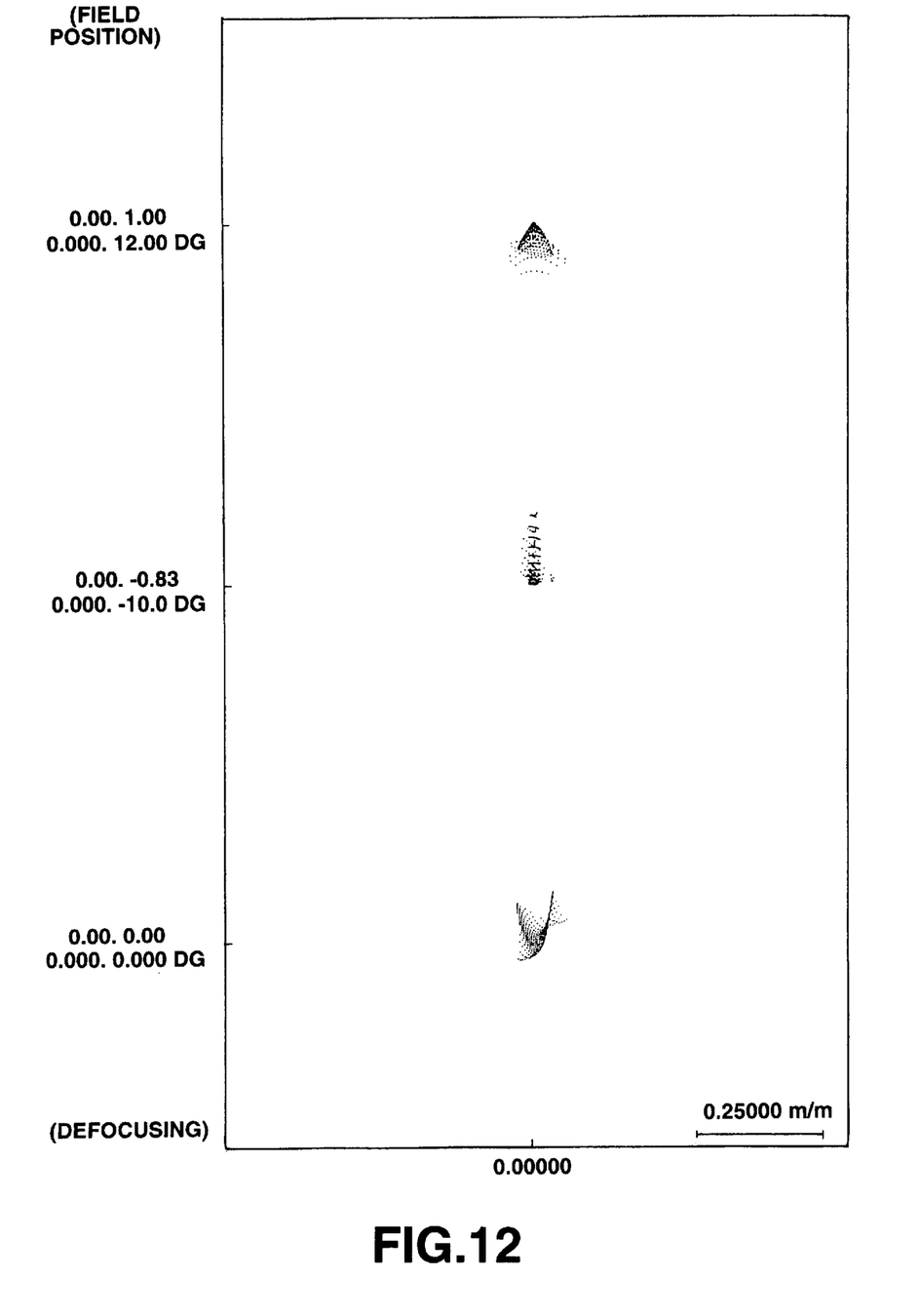
FIG. 12 is a spot diagram when the Lippman volumetric hologram is formed to have a planar surface.
Figure 13:
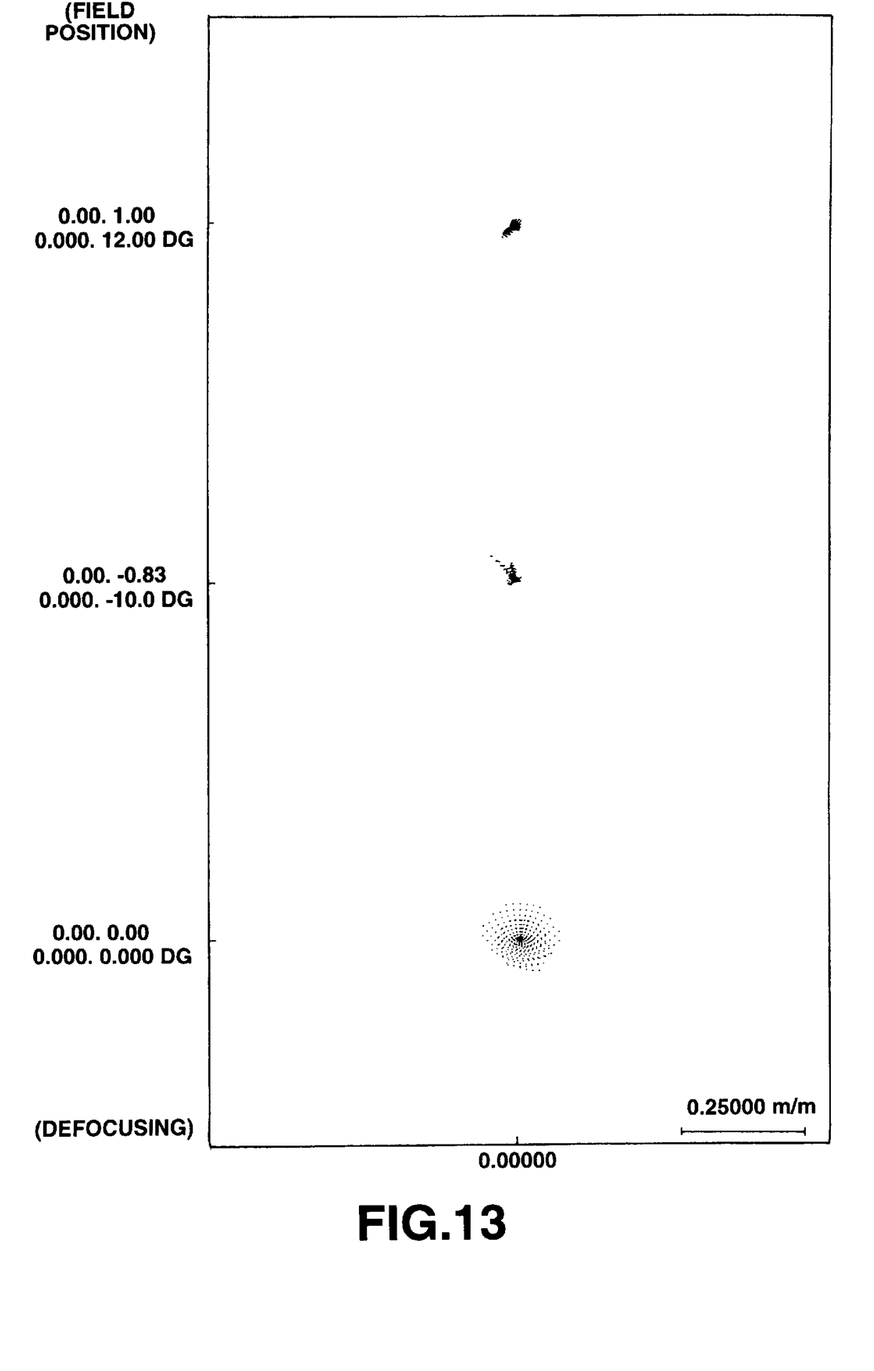
FIG. 13 is a spot diagram when the Lippman volumetric hologram is formed to have a concave surface.
Figure 15:
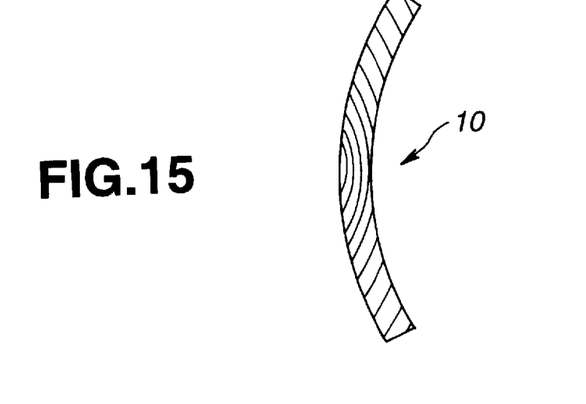
FIG. 15 is a schematic cross-sectional view showing the state of internal interference fringes when the Lippman volumetric hologram is formed to have a convex surface.
Figure 16:
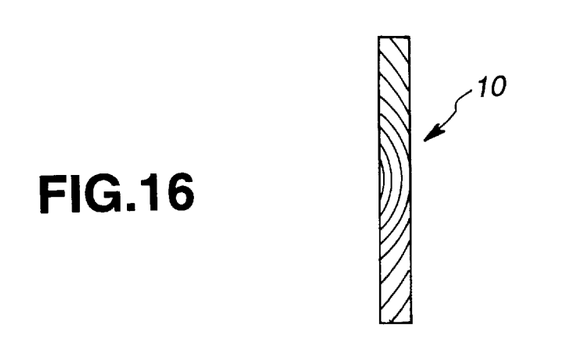
FIG. 16 is a schematic cross-sectional view showing the state of internal interference fringes when the Lippman volumetric hologram is formed to have a planar surface.
Figure 17:
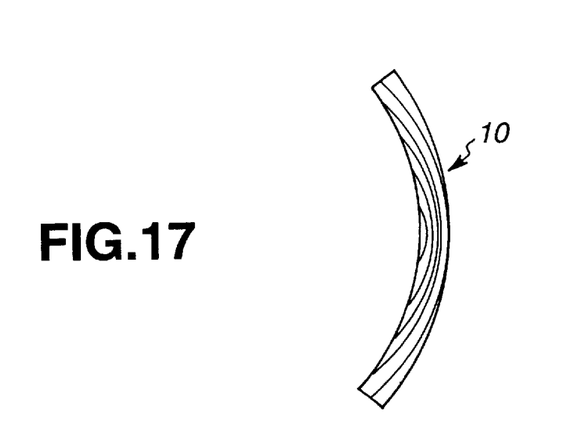
FIG. 17 is a schematic cross-sectional view showing the state of internal interference fringes when the Lippman volumetric hologram is formed to have a concave surface.

It is now shown how aberration characteristics as the reflection type lens of the Lippman volumetric hologram are changed by its shape. FIGS. 8 to 10 show light ray tracing diagrams for an optical system of the eccentricity type used for observing a virtual image having a convex surface, a planar surface and a concave surface, respectively. FIGS. 11 to 13 show spot shapes on the image display device for the optical system of the eccentricity type used for observing a virtual image having convex, planar and concave surfaces, respectively, while FIGS. 15 to 17 show schematic states of the interference fringes for the optical system of the eccentricity type used for observing a virtual image having convex, planar and concave surfaces, respectively. These three sorts of the optical system of the eccentricity type for observing a virtual image, having convex, planar and concave surfaces, are designed to operate under the identical conditions, namely the wavelength in use of 544 nm, an incident pupil system of 10 nm, and the angles of field of −10°, 0° and 12°, with the sole difference being the shape of the Lippman volumetric hologram and non-spherical phase coefficient of the interference fringes recorded on this hologram. The respective lens lists are shown by the following tables 1 to 3.

TABLE 1

|  | RDY | THI |  |
|---|---|---|---|
| OBJ | INFINITY | INFINITY |  |
| STO | INFINITY | 100.000000 |  |
| 2 | 150.00000 | −75.000000 |  |
|  | HDE: |  |  |
|  | HV1: REA | HV2: VTR | HOR: 1 |
|  | HTH: 25.000000 | HIN: 1.500000 | HDI: 0.040000 |
|  | HX1: $0.000000^{00}$ | HY1: $-0.340000^{10}$ | HZ1: $-0.940000^{10}$ |
|  | HX2: $0.000000^{00}$ | HY2: $0.256500^{02}$ | HZ2: $-0.704800^{02}$ |
|  | HW1: 544.00 | HT0: SPH | HCT: XY |
|  | HCO |  |  |
|  | C1: $-1.3862^{-21}$ | C2: $-8.5676^{-05}$ | C3: $-1.4961^{-04}$ |
|  | C4: $4.1127^{-04}$ | C5: $-2.0727^{-05}$ | C6: $-9.0583^{-05}$ |
|  | C7: $2.7920^{-04}$ | C8: $1.1152^{-05}$ | C9: $1.8619^{-05}$ |
|  | C10: $3.5829^{-05}$ | C11: $-3.9848^{-09}$ | C12: $5.1970^{-07}$ |
|  | C13: $-7.7045^{-07}$ | C14: $5.0211^{-09}$ | C15: $1.5346^{-06}$ |
|  | C16: $2.0443^{-08}$ | C17: $9.5356^{-08}$ | C18: $-1.9696^{-08}$ |
|  | C19: $-1.4967^{-08}$ | C20: $1.3323^{-09}$ | C21: $-2.7323^{-08}$ |
|  | C22: $-3.0704^{-08}$ | C23: $2.1950^{-09}$ | C24: $6.9696^{-10}$ |
|  | C25: $-1.2525^{-09}$ | C26: $6.5845^{-10}$ | C27: $-2.5163^{-10}$ |
|  | XDE: 0.000000 | YDE: 0.000000 | ZDE: 0.000000 |
|  | ADE: −20.000000 | BDE: 0.000000 | CDE: 0.000000 |
| IMG | IDENTITY | 0.000000 |  |

TABLE 2

|  | RDY | THI |  |
|---|---|---|---|
| OBJ | INFINITY | INFINITY |  |
| STO | INFINITY | 100.000000 |  |
| 2 | INFINITY | −75.000000 |  |
|  | HOE: |  |  |
|  | HV1: REA | HV2: VIR | HOR: 1 |
|  | HTH: 25.000000 | HIN: 1.500000 | HDI: 0.040000 |
|  | HX1: $0.000000^{00}$ | HY1: $-0.342000^{10}$ | HZ1: $-0.940000^{10}$ |
|  | HX2: $0.000000^{00}$ | HY2: $0.256500^{02}$ | HZ2: $-0.704800^{02}$ |
|  | HWL: 544.0 | HT0: SPH | HCT: XY |
|  | HCO |  |  |
|  | C1: $0.0000^{-00}$ | C2: $-8.5676^{-05}$ | C3: $-5.7174^{-07}$ |
|  | C4: $-9.5441^{-05}$ | C5: $-1.0138^{-05}$ | C6: $1.2211^{-06}$ |
|  | C7: $7.5211^{-07}$ | C8: $-1.9097^{-06}$ | C9: $-1.3331^{-05}$ |
|  | C10: $3.4607^{-08}$ | C11: $-2.3688^{-08}$ | C12: $-1.3772^{-07}$ |
|  | C13: $1.1723^{-07}$ | C14: $-2.4034^{-08}$ | C15: $2.6039^{-08}$ |
|  | C16: $1.6521^{-09}$ | C17: $-6.9739^{-09}$ | C18: $-3.0665^{-09}$ |
|  | C19: $1.8369^{-09}$ | C20: $-8.7265^{-10}$ | C21: $-3.4130^{-08}$ |
|  | C22: $-5.5599^{-09}$ | C23: $-6.2655^{-10}$ | C24: $4.8188^{-10}$ |
|  | C25: $-5.4622^{-10}$ | C26: $-7.6935^{-11}$ | C27: $-1.2939^{-10}$ |
|  | XDE: 0.000000 | YDB: 0.000000 | ZDB: 0.000000 |
|  | ADE: −20.000000 | BDB: 0.000000 | CDE: 0.000000 |
| IMG | INFIMITY | 0.000000 |  |

TABLE 3

|  | RDY | THI |  |
|---|---|---|---|
| OBJ | INFINITY | INFINITY |  |
| STO | INFINITY | 100.000000 |  |
| 2 | −150.00000 | −75.000000 |  |
|  | HOE: |  |  |
|  | HV1.: REA | HV2: VIR | HOR: 1 |
|  | HTH: 25.000000 | HIN: 1.500000 | HDI: 0.040000 |
|  | HX1: $0.000000^{00}$ | HY1: $-0.342000^{10}$ | HZ1: $-0.940000^{10}$ |
|  | HX2: $0.000000^{00}$ | HY2: $0.256500^{02}$ | HZ2: $-0.704800^{02}$ |
|  | HWL: 544.0 | HT0: SPH | HCT: XY |
|  | HCO |  |  |
|  | C1: $-1.0841^{-21}$ | C2: $-8.5676^{-05}$ | C3: $-9.1678^{-06}$ |
|  | C4: $-1.6793^{-06}$ | C5: $2.3098^{-05}$ | C6: $-1.8353^{-06}$ |
|  | C7: $-3.2764^{-07}$ | C8: $3.6905^{-06}$ | C9: $8.7745^{-06}$ |
|  | C10: $-1.4400^{-06}$ | C11: $-2.3617^{-07}$ | C12: $-3.1647^{-07}$ |
|  | C13: $3.8731^{-09}$ | C14: $1.4232^{-08}$ | C15: $6.8225^{-08}$ |
|  | C16: $1.3354^{-08}$ | C17: $-8.7935^{-09}$ | C18: $2.4006^{-08}$ |
|  | C19: $-4.6014^{-09}$ | C20: $-2.0923^{-09}$ | C21: $4.7914^{-08}$ |
|  | C22: $3.0306^{-09}$ | C23: $-2.2313^{-09}$ | C24: $4.8307^{-08}$ |
|  | C25: $2.9750^{-10}$ | C26: $3.6540^{-11}$ | C27: $-4.457^{-11}$ |
|  | XDE: 0.000000 | YDE: 0.000000 | ZDE: 0.000000 |
|  | ADE: −20.000000 | BDE: 0.000000 | CDE: 0.000000 |
| IMG | INFINITY | 0.000000 |  |

The non-spherical phase coefficient of the interference fringes is used to add the phase difference generated on light exposure on a non-spherical wavefront to the phase difference on a hologram surface generated on light exposure of simple two-point light source. It is noted that HX1, HY1, HZ1, HX2, HY2 and HZ2 in the lens list represent coordinates of the two-point light source. The phase ΦHOE on an actual hologram surface may be represented as follows:

$$\phi\text{poly} = \Sigma \sigma_{ij} X^i Y^j (C00=0)$$

where φ2points is the phase difference on the hologram surface generated by light exposure of the two-point light source and φpoly is the phase difference on the hologram surface generated by light exposure on the non-spherical wavefront, x and y being coordinates on the hologram surface, both φ2points and φpoly being expressed by light path difference. These coefficients can be set by automatic designing so that the light beam will be collected satisfactorily on the image display device when the collimated light beams are radiated at the angles of field of −10°, 0° and 12° from the pupil by reverse light ray tracing. In the three examples, the same automatic design routine is used. The results of optimization of three angles of field are shown in the spot diagrams of FIGS. 11 to 13. It is seen from above that difference in the amount of aberration is produced for the hologram shapes of the convex, planar and concave shapes. The amount of aberration is minimized for the concave hologram shape.

Figure 14:
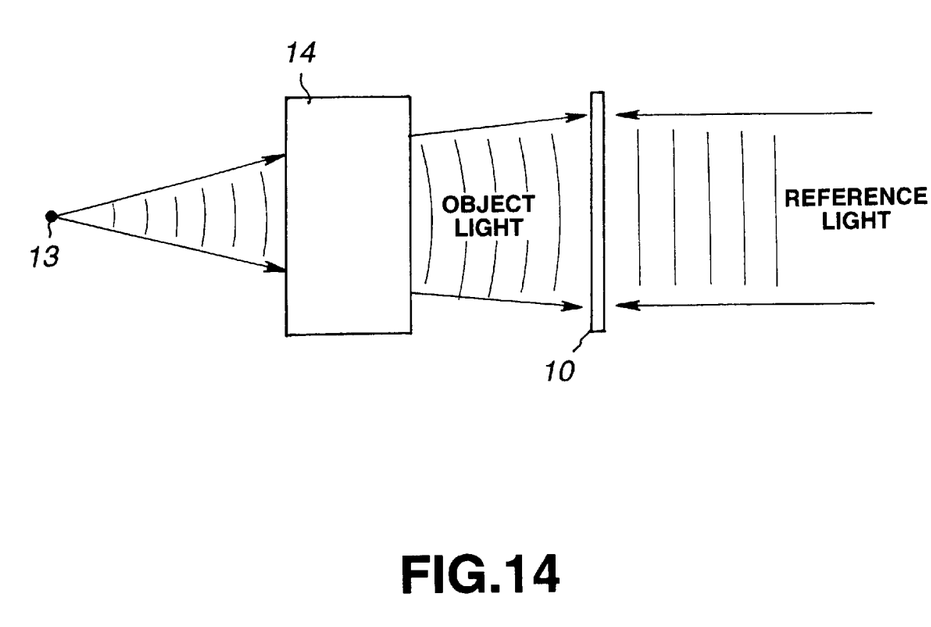
FIG. 14 is a side view showing the structure of an optical system for the preparation of the Lippman volumetric hologram used in the optical system used for observing a virtual image.

The above-described Lippman volumetric hologram can be manufactured using an optical system used for the preparation of the Lippman volumetric hologram having a point light source 13 and a non-spherical wavefront generating optical block 14. In this optical system used for the preparation oxy the Lippman volumetric hologram, a collimated light beam is used as a reference light beam, while the spherical wave converted into a non-spherical wave by passage through the non-spherical wavefront generating optical block 14 is used as an object light beam.

If the Lippman volumetric hologram is formed to have a convex surface, the state of interference fringes in the hologram is such that the direction of curvature of the hologram is reversed from that of the interference fringes, as shown in FIG. 15. On the other hand, if the Lippman volumetric hologram is formed to have a concave surface, the state of interference fringes in the hologram is such that the direction of curvature of the hologram coincides with that of the interference fringes, as shown in FIG. 17.

That is, the non-spherical phase is not affected by the large curvature of the interference fringes and hence is basically determined by the position of the two-point light source. It is seen from this that the curvature of the interference fringes is closest to the hologram curvature when the hologram is of a concave shape, as shown in FIG. 17, with the aberration characteristics being optimum when the hologram is of the concave shape.

Thus, if the Lippman volumetric hologram is used as a reflection type lens in the optical system used for observing a virtual image, the aberration characteristics of the hologram lens may be improved by having the hologram shaped so as to have the curvature in the same direction as that of the interference fringes formed in the hologram.

Figure 18:
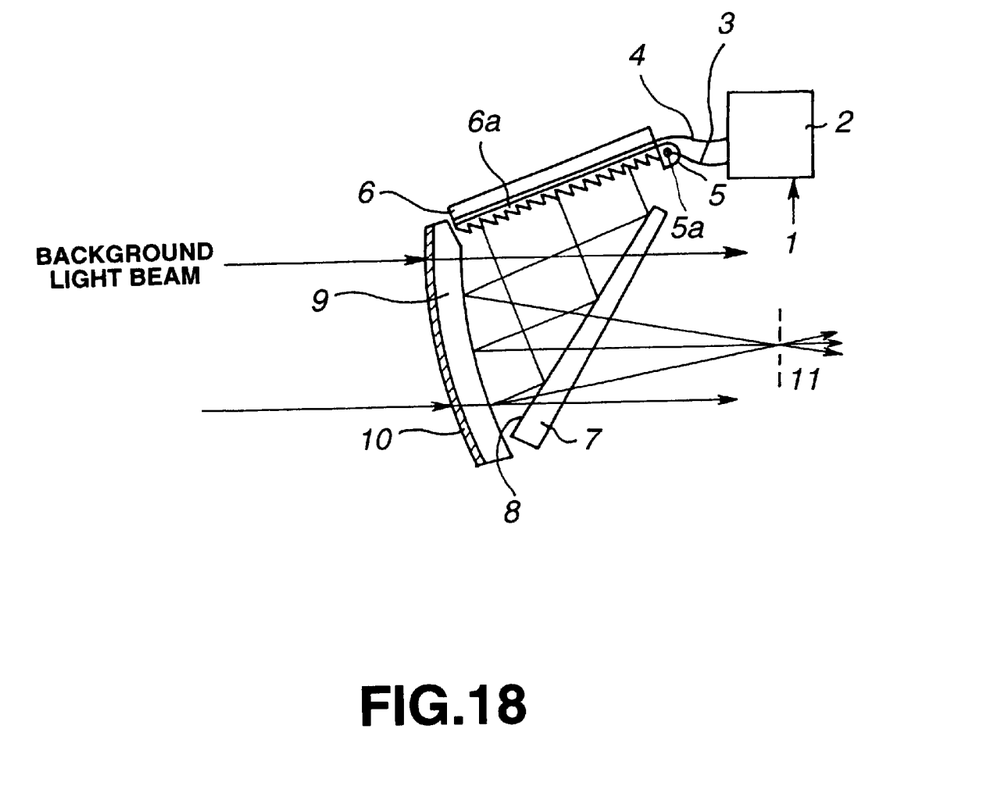
FIG. 18 is a plan view showing the structure of a fourth embodiment of the optical system used for observing a virtual image according to a third embodiment of the present invention.

The optical system used for observing a virtual image according to the present invention can be constructed as full color system using the reflection type liquid crystal display device. Specifically, with the present optical system used for observing a virtual image, video signals 1 are entered to an LCD driver 2 (liquid crystal display driving circuit). The LCD driver 2 outputs an LED (light emitting diode) illuminating current 3 and a driving signal 4 for driving an LCD 6 (liquid crystal display) as an image display device, so as to be entered to a light 5 and to a LCD 6, respectively.

The light 5 includes an LED array 5a carrying several chip-size LEDs having a light emitting center wavelengths of 470 nm, 525 nm and 640 nm as a light source. The LCD 6 as the image display device may be a 0.55 inch reflection type liquid crystal display. With this LCD 6, image signals as electrical signals are converted into an image. The light beam incident on the LCD 6 from the light 5 via a light conducting plate 6a is modulated depending on the image and reflected by the LCD 6. The light thus reflected by the LCD 6 falls on the wedge-shaped polarizing type beam splitter 7 operating as the light beam splitting device. In the wedge-shaped polarizing type beam splitter 7, a portion of the totality of the incident light is transmitted through the wedge-shaped polarizing type beam splitter 7, operating as a light beam splitting device, with the remaining light being reflected by the polarizing type light beam splitting film 8 formed on the wedge-shaped polarizing type beam splitter 7 so as to fall on the HOE (holographic optical element) substrate 9. The HOE substrate 9 is formed to a cylindrical shape recessed with respect to the incident light from the wedge-shaped polarizing type beam splitter 7. Of the light beam transmitted through the HOE substrate 9, only the light rays of a specified wavelength range, that is light rays of a wavelength, the interference fringes of which in the Lippman volumetric hologram 10 meet the Bragg's condition, are selectively reflected. Here, only light rays of the order of 10 nm in terms of the total widths of the half-value centered about 470 nm, 525 nm and 640 nm are reflected.

The light rays reflected by the Lippman volumetric hologram 10 are again transmitted through the HOE substrate 9 to fall on the wedge-shaped polarizing type beam splitter 7, with a portion of the incident light rays being transmitted through the wedge-shaped polarizing type beam splitter 7 to fall on the pupil 11 of the viewer. On the other hand, the background light beam proceeding from the reverse side of the HOE substrate 9 is transmitted through the Lippman volumetric hologram 10, HOE substrate 9 and the wedge-shaped polarizing type beam splitter 7 to fall on the pupil 11.

In the spectrum of the light rays reaching the pupil 11 from the background, the light rays in the vicinity of 470 nm, 525 nm and 640 nm are reflected by the Lippman volumetric hologram 10 so that the light intensity in these wavelength ranges are lowered substantially in inverse proportion to the diffraction efficiency.

In this optical system used for observing a virtual image, the HOE substrate 9 is of substantially the cylindrical meniscus shape having a curvature in the same direction as the curvature of the interference fringes in the hologram. The result is the decreased amount of aberration produced in the Lippman volumetric hologram 10.

What is claimed is:

1. A non-co-axial type optical system used for observing a virtual image comprising:
   an image display device; and
   at least one optical element and a Lippman volumetric hologram cooperating with each other to form a virtual image of a display image of said image display device;
   said Lippman volumetric hologram being contoured so as to have a curvature in only one direction that is in the same direction as a curvature of interference fringes operating for generating a refractive power in said Lippman volumetric hologram, the direction of curvature of said hologram being substantially coincident with the direction of eccentricity of the non-co-axial type optical system.

2. The non-co-axial type optical system used for observing a virtual image according to claim 1 wherein the Lippman volumetric hologram is contoured to have a radius of curvature not less than 10 mm.

3. The non-co-optical type optical system used for observing a virtual image according to claim 1 wherein the image display device is a reflection type liquid crystal image display device.

4. A non-co-optical type optical system used for observing a virtual image comprising:
   an image display device; and
   a Lippman volumetric hologram for forming a virtual image of a display image of said image display device;
   said Lippman volumetric hologram being contoured so as to have curvature in only one direction that is in the same direction as a curvature of interference fringes operating for generating a refractive power in said Lippman volumetric hologram, the direction of curvature of said hologram being substantially coincident with the direction of eccentricity of the non-co-axial type optical system.

5. The non-co-axial type optical system used for observing a virtual image according to claim 4 wherein the Lippman volumetric hologram in contoured to have a radius of curvature not less than 10 mm.

6. The non-co-axial type optical system used for observing a virtual image according to claim 4 further comprising:
   a light beam splitting element between the image display device and the Lippman volumetric hologram.

7. The non-co-axial type optical system for observing a virtual image according to claim 6 wherein the Lippman volumetric hologram is contoured to have a curvature only in one direction.

8. The optical system used for observing a virtual image according to claim 7 wherein the Lippman volumetric hologram is contoured to have a radius of curvature not less than 10 mm.

9. The optical system used for observing a virtual image according to claim 7 wherein the Lippman volumetric hologram is contoured so that the direction of said curvature is coincident with the direction of eccentricity of the optical system.

10. The optical system used for observing a virtual image according to claim 4 wherein the image display device is a reflection type liquid crystal image display device.

* * * * *